Aug. 12, 1969     A GOODING     3,460,659
STORAGE VESSEL
Filed Jan. 19, 1967

INVENTOR.
ARNOLD Gooding
BY John C. Quinlan
Dan H. Phillips
ATTORNEYS

United States Patent Office 3,460,659
Patented Aug. 12, 1969

3,460,659
STORAGE VESSEL
Arnold Gooding, Roselle, N.J., assignor to Pullman Incorporated, Chicago, Ill., a corporation of Delaware
Filed Jan. 19, 1967, Ser. No. 610,366
Int. Cl. B65g 11/00
U.S. Cl. 193—3
5 Claims

ABSTRACT OF THE DISCLOSURE

A storage vessel comprising a chamber having a wall or walls disposed outwardly from the vertical axis of the vessel from an upper material inlet to a lower material outlet.

---

Figure 1:
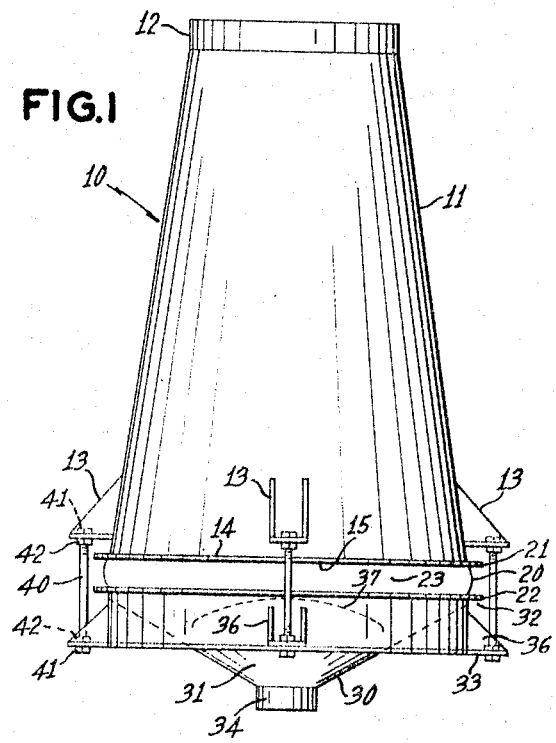

This invention relates to means for storing powdered or granular material. Specifically, this invention relates to a storage chamber of such configuration that, upon being gravitationally emptied, flow of the stored material from the vessel is continuous and self-sustaining until a minimum amount of the material stored therein remains within the chamber.

It is customary to store solid materials of granular or powder-like consistency in a vessel from which such materials are subsequently caused to be removed by gravitational emptying. One such instance is the storage of catalysts above reactors with subsequent gravitational emptying of the catalyst from the vessel into the reactor. Another is the instance of storage of in-process or product fertilizer solids in granular or prill form and having varying characteristics of tackiness which causes the solids to "set up" upon standing and become difficult to empty. In these and similar instances, it frequently happens that upon emptying the storage chamber, flow of the stored material is not self-initiating or if self-initiating, continues for a short period of time, only to cease before the desired quantity of material has been emptied from the vessel. In still other instances, flow may be self-initiating and continuous thereafter to relatively complete emptying of the vessel at which point, however, an undesirably large amount of material remains retained within the storage chamber.

Numerous factors are significant in influencing the amount of material which is retained within the storage vessel in such instances. These include the configuration of the storage chamber, the relationship between its relative storage volume and its discharge area, and the characteristics of the material being stored. These latter include its size, moisture content, extraneous matter content and more specifically, its characteristic angles of repose and of slide.

In order to initiate flow from storage vessels and to insure continuity of flow thereafter, various auxiliary equipment is often employed in combination with the storage vessel. Such equipment may include vibrators to impart motion to the vessel. These vibrators are frequently used in conjunction with a separate hopper which may be attached to the lower material outlet of the storage vessel by means of a flexible coupling. In using this combination, vibratory motion imparted to the storage vessel is transmitted to the hopper by means of the flexible coupling but motion between the vessel and hopper is not in unison with the result that a greater overall vibratory effect is achieved than would be the case if the vessel and hopper were vibrated as a unit.

Anti-packing devices are also frequently employed. These may be installed within the storage vessel itself or may be installed within a separate hopper. Anti-packing devices usually comprise a plate-like member which is located above the discharge opening of the vessel proper, or of the hopper. Such a device is positioned so as to support that portion of the material directly above the anti-packing device. When properly proportioned in relation to the size of the discharge opening, the column of material above the device is larger in diameter than that column of material directly above the discharge opening. Upon emptying the vessel, material flowing downward in the vessel in a direction toward the discharge opening passes around the device and, in doing so, reduces the possibility of the material arching or clinging to the side walls of the vessel by eliminating what is known as "rat holing," that is, the creation of a center column of flow directly above the discharge opening to the essential exclusion of flow from areas more remote from the center column of flow.

Various means and methods have been employed in the art to facilitate flow of materials from storage vessels based on an empirical evaluation of the shape of the vessel. Generally, the prior art has been concerned with the configuration of the storage vessel as related to arching of the stored material within the vessel.

In storage vessels developed in the art, it has been considered desirable to have the walls of the vessel support some of the weight of the material and thereby prevent packing in the lower regions. It has been found that sides parallel to the vertical axis of the storage vessel speed up free flow of certain material but are detrimental when used with materials which tend to arch. Accordingly, it has long been the practice within the art to use storage vessels of an inverted cone or pyramid configuration, that is, vessels having sides which slope inwardly towards the vessel's vertical axis in the direction of a low point of discharge. When emptying such vessels, the material does not slide down the sloping sides of the vessel until that material in line with the opening has been discharged. Instead, the material tends to slide down a fairly well-defined surface of the material itself, this surface being known as the plane or rupture and being rather steeply inclined. Generally, however, there is more friction involved when material slides upon itself than when it slides on the sides of the inclined walls of the vessel and, accordingly, vessels of such configuration tend to retain undesirably large quantities of the stored material within the vessel upon cessation of flow.

Accordingly, it is the object of this invention to provide a storage vessel, the general configuration of which facilitates flow therefrom. It is another object of this invention to provide a storage vessel which minimizes the effects of extraneous materials, such as moisture or oil, in deterring flow of the material stored from the vessel. It is still another object of this invention to minimize the number of supplementary devices which are required to be incorporated in a solid material storage system to originate and maintain continuous flow after extended periods of storage within the vessel. It is yet another object of this invention to provide a storage vessel or chamber of new and unique configuration which permits storage of reasonably large quantities of solids for prolonged periods with subsequent discharge from an opening having a relatively small area in comparison to the cross-sectional area of the vessel. Various other objects and advantages of the invention will be apparent to those skilled in the art from the following detailed discussion and description.

These objects are achieved in accordance with the invention by providing an upright storage vessel which comprises a chamber having an upper inlet and a lower outlet, the chamber being bounded at least in part by a wall inclined outwardly with respect to the vertical axis of said vessel from the inlet to the outlet. The chamber can be bounded by a single continuous wall, thereby forming an upright conical chamber, or by a plurality of walls, in which case it is preferred that at least two of the walls be inclined outwardly with respect to the vertical axis of the vessel from the inlet to the outlet. The configuration of the chamber can vary widely, having one, two, three or more walls, either planar or curvilinear or some combination thereof, it only being necessary that a sufficient number of walls be downwardly sloped away from the vessel's vertical axis to effect the sustained flow of materials from the chamber.

In some instances, it is only necessary that a portion of the wall be sloped downwardly and outwardly from the vessel's vertical axis. Such would be the case where the upper walls of the chamber are parallel to the vertical axis of the vessel while the lower walls of the chamber slope downwardly and outwardly from the vessel's vertical axis. With any particular configuration of chamber walls, there is no specific angularity of the chamber's sides from its vertical axis that is optimum for all materials being handled. A minimum angularity of the chamber's sides from its vertical axis of 1° has been found sufficient to be effective, there being no upper limit to the degree of angularity, this being limited by the practicality of reducing storage capacity of the chamber upon further increasing the angularity of its walls. A preferred angle of between about 1 and about 15 degrees has been found suitable from the standpoint of effectiveness while not acting to decrease storage capacity beyond the practical. It is to be understood, however, that the angularity may vary from point to point along the plane of any particular wall, as for example, in that instance wherein the wall is of hyperbolic or parabolic configuration. It is also to be understood that angularity of the walls from the vertical axis over their entire length is not required so long as walls angularly disposed to the vertical axis are employed over substantial portions of their lengths so as to establish and maintain flow.

Figure 2:
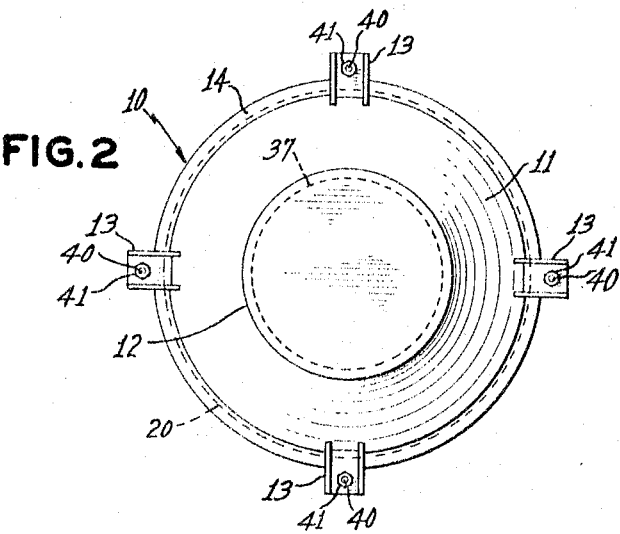

Reference is made to the accompanying drawing illustrating one form of the invention. FIGURE 1 is a side view or elevation of a storage vessel or chamber and FIGURE 2 is a top or plan view of the same embodiment of the vessel.

As illustrated, conical storage chamber 10 is shown in combination with hopper 30 and flexible coupling 20 located therebetween. It is to be understood, however, that the storage chamber can be integral with a hopper.

For purposes of illustration, storage chamber 10 is of conical configuration having sides 11 angularly disposed from the centerline of the vessel in a downward direction. As shown, sides 11 slope downwardly and outwardly at an angle of 8° from the vertical. The vessel is equipped with inlet 12, support brackets 13, bottom flange 14 which defines lower outlet 15.

Hopper 30 is of inverted pyramid configuration having walls 31, inlet flange 32, outlet 34, support flange 33 affixed to which are support brackets 36. The hopper is also supplied with an internal anti-packing device 37 supported in any suitable manner from walls 31.

Flexible coupling 20 comprises top flange 21 matching bottom flange 14 of storage chamber 10 and lower flange 22 matching inlet flange 32 of the hopper. Between top flange 21 and lower flange 22 is attached flexible material 23.

Connections are made in any suitable manner between chamber bottom flange 14 and flexible coupling top flange 21, and between flexible coupling lower flange 22 and hopper inlet flange 32 in such a manner that material passes from chamber 10 down into hopper 30 and out through hopper outlet 34.

Further interconnection is made between vessel 10 and hopper 30 by means of tie rods 40 held in place through support brackets 13 and 36 by means of nuts 41 and 42, in such a manner that motion imparted by external vibratory means, not shown, to chamber 10 is transmitted to hopper 30. Outlet 34 of hopper 30 is equipped with suitable closing means, not shown, to either prevent discharge therethrough during storage or to permit discharge therethrough during emptying of chamber 10. Any variable position, flow-stopping device, such as a slide valve, is suitable.

In the operation of one of the embodiments of the invention, material is charged to storage chamber 10 through inlet 12, outlet 34 of hopper 30 being closed to prevent discharge. Material is charged to chamber 10 to any height. When it is desired to discharge the material from chamber 10, outlet 34 of hopper 30 is opened. Flow may be self-initiated or may be initiated by actuation of an external vibrator, not shown, affixed to vessel 10. In either instance, flow will be down around the outer periphery of the anti-packing device 37 and out through outlet 34. Flow from chamber 10, when once initiated, will tend to continue due to the configuration of the vessel. Material flowing downward around the outer periphery of anti-packing device 37 will tend to remove that material located in the outer-most areas from the vertical axis of chamber 10. Upon removal of such materials, that material immediately thereabove becomes unsupported in a vertical direction and tends to move downward due to gravitational force. Due to the sloping of the walls away from the vertical axis of the vessel, there exists a minimum of vessel surface in any downwardly vertical direction to supply support for the material within the chamber. Accordingly, arching, as related to the retention of material within the vessel, is essentially avoided with the result that virtually complete emptying of the chamber is obtainable.

It will be apparent to one skilled in the art that many specific variations can be made in the configuration of the vessel described herein while retaining the described advantages and without departing from the scope of the invention. For example, the angularity of the sides of the chamber can be varied over wide ranges. Similarly, it is not necessary that the sides of the vessel be uniform or continuous in respect to their sloping characteristics. Essentially vertical sides can be employed either in the upper portion of the chamber or in its lowermost portions, as long as sides angularly disposed to the vertical axis of the vessel are employed over substantial portions of their length.

What is claimed is:

1. A vessel for storage of solid granular material and discharge of such material therefrom through a discharge opening provided in a bottom portion of said vessel, which comprises:

an upper chamber having an upper inlet, said chamber being bounded at least in part by a wall inclined outwardly with respect to the vertical axis of said vessel from said inlet to said discharge opening, a lower hopper in vertical alignment with said upper chamber and flexibly mounted thereto; an antipacking device mounted above said discharge opening having a larger cross-sectional area than that of said discharge opening; means for supporting the anti-packing device by said lower hopper, and means for directly imparting vibratory motion to the chamber.

2. The vessel defined in claim 1 wherein said chamber is bounded by a plurality of walls of which at least two are inclined outwardly with respect to the vertical axis of said vessel from said inlet to said discharge opening.

3. The vessel defined in claim 1 wherein said chamber is bounded by a single continuous wall thereby forming an upright conical chamber.

4. The vessel defined in claim 1 wherein said wall is inclined outwardly with respect to the vertical axis of said vessel over the entire length of said wall.

5. The vessel of claim 3 wherein said continuous wall is inclined at an angle of between about 1° and about 15° from the vertical axis of said vessel.

References Cited

UNITED STATES PATENTS

| | | | |
|---|---|---|---|
| Re. 26,291 | 9/1967 | Carrier | 198—59 X |
| 832,400 | 10/1906 | Lyons | 193—2 |
| 1,625,576 | 4/1927 | Stacy | 193—30 |
| 1,947,011 | 2/1934 | Karthauser | 193—2 |
| 2,258,516 | 10/1941 | Richardson | 193—2 |
| 2,625,305 | 1/1953 | Conkling. | |
| 2,851,173 | 9/1958 | Morrison | 198—64 X |

ANDRES H. NIELSEN, Primary Examiner